Figure 1:
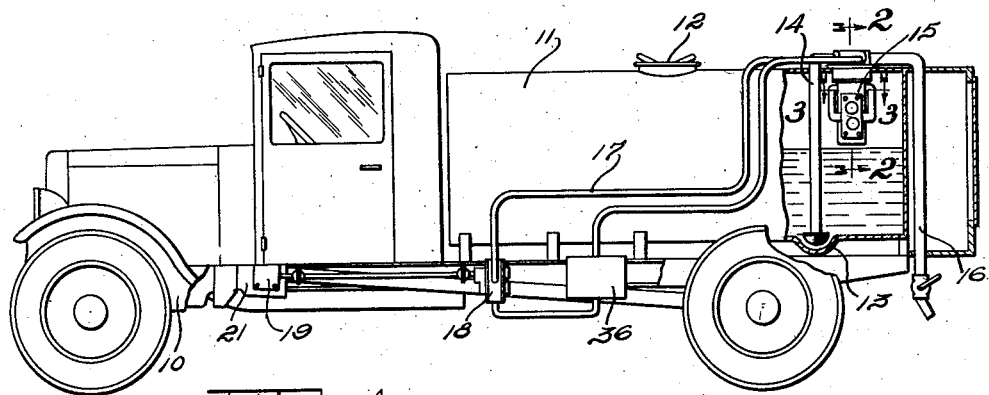

Nov. 10, 1936.　　　　E. R. BARRETT　　　　2,060,484
TANK TRUCK AND FLUID CIRCULATING SYSTEM
Filed May 31, 1935　　　2 Sheets-Sheet 1

INVENTOR.
Edward R. Barrett.
BY
Harness, Dickey, Pierce & Hann.
ATTORNEYS.

Nov. 10, 1936.   E. R. BARRETT   2,060,484
TANK TRUCK AND FLUID CIRCULATING SYSTEM
Filed May 31, 1935.   2 Sheets-Sheet 2
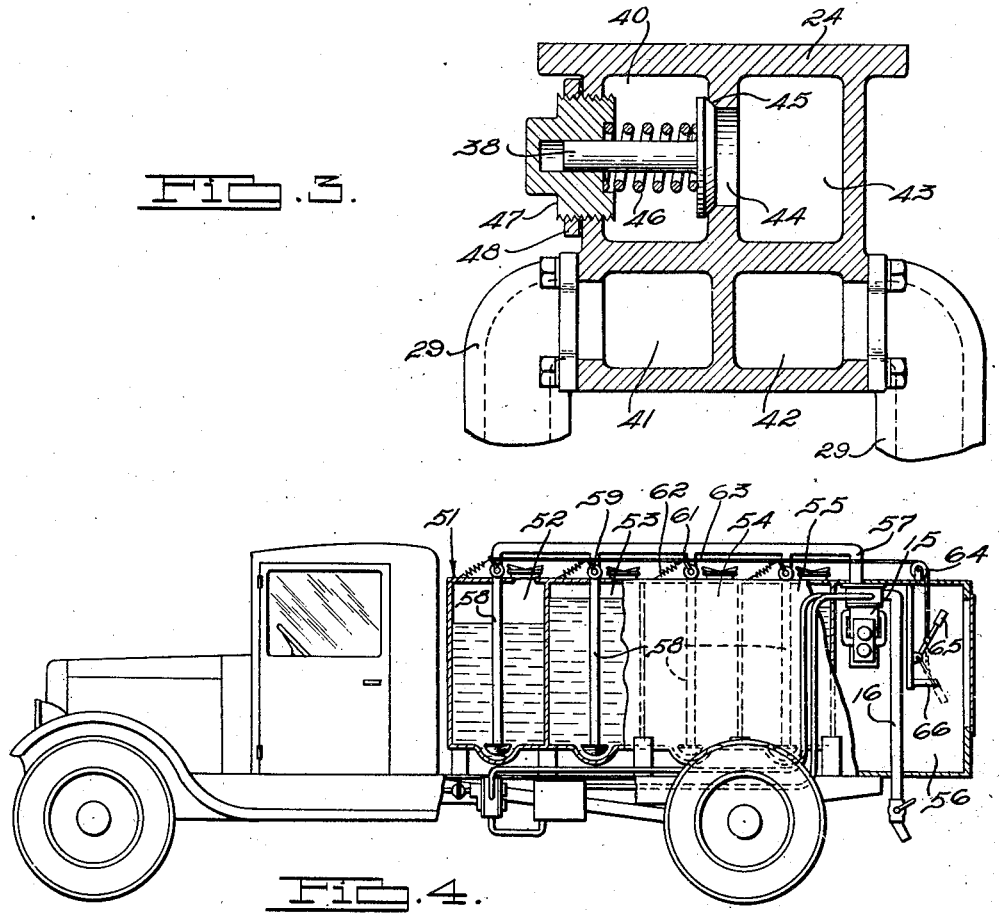
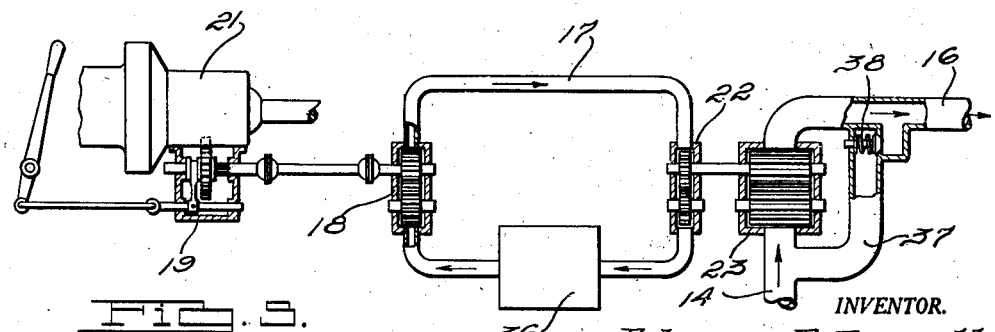
INVENTOR.
Edward R. Barrett.
BY
Harness, Dickey, Pierce & Hann.
ATTORNEYS.

Patented Nov. 10, 1936

2,060,484

UNITED STATES PATENT OFFICE 2,060,484

TANK TRUCK AND FLUID CIRCULATING SYSTEM

Edward R. Barrett, Detroit, Mich., assignor to Gar Wood Industries, Inc., a corporation of Michigan Application May 31, 1935, Serial No. 24,376

8 Claims. (Cl. 221—67)

My invention relates to pumping systems, and particularly to a method and means for pumping a fluid from one or a plurality of tanks of an automotive tank car vehicle.

It has been the practice heretofore of employing valves connected to the bottom of the tanks of automobile tank trucks from which the liquid in the tank is conducted by gravity. For the reason that certain fire writers' codes require the liquid to be removed from the top of the tanks and also when a greater flow of the liquid is desirable under positive pressure, the herein described pumping system was invented. The system meets the code requirements and provides a positive and more rapid flow of liquid from the tank.

In the present system, a pump is driven by the engine of the automobile tank truck through a power take-off device connected to the truck transmission system. Means is employed in conjunction with the vehicle clutch for connecting and disconnecting the device to the transmission and the engine controls are utilized for controlling the driving of the pump. The pump circulates a liquid through a system embodying a fluid motor to drive the motor at a considerably higher rate of speed than that at which the pump is driven. This is effected by selecting a motor having a capacity less than that of the pump so that a pressure will be built up in the fluid which will increase its velocity of flow at the motor, the speed of which is materially increased. A second pump having a greater capacity than the pump or motor first mentioned, is driven by the motor at high speed and produces a rapid flow of fluid from a tank. A conduit provided with a pressure actuated by-pass valve is disposed about the second pump to permit the flow of fluid therefrom to be shut off while the system is in operation, the fluid being circulated about the pump. This prevents a pressure from being built up above a predetermined amount.

This system is supported on the truck with the motor and pump within the tank, if a single tank is employed, or within the can-compartment at the back of the tank, when a plurality of tanks are employed. In the latter instance, a plurality of remotely actuated valves are utilized for cutting in and out the various compartments to the pump of the exhausting system. The motor and pump are preferably of the gear type and directly connected. They are supported on a header which is secured in the wall of the tank, when the motor and pump are supported within the tank. The header provides separate passages to the motor and pump and forms the means for connecting the motor and pump to their respective fluid circuits.

Accordingly the main objects of my invention are: to provide an automobile tank truck with a circulating system which removes the fluid from the top of the tank under positive pressure; to provide a tank with a motor-pump system which is supported within the tank on a header which connects the separate fluid circuit thereto; to provide a pumping system on an automobile tank truck having a plurality of compartments with means for connecting each of the compartments separately to the pumping system; to drive the motor of the pumping system by a fluid pump of greater capacity than the motor to thereby produce an increased speed to the motor and to the pump which it operates; to drive the pump of the system from a power take-off device connected to the engine of the vehicle, and, in general, to provide a pumping system for a tank which is a self-contained unit, which draws the liquid from the top of the tank and which provides a positive and increased flow of fluid from the tank.

Figure 2:
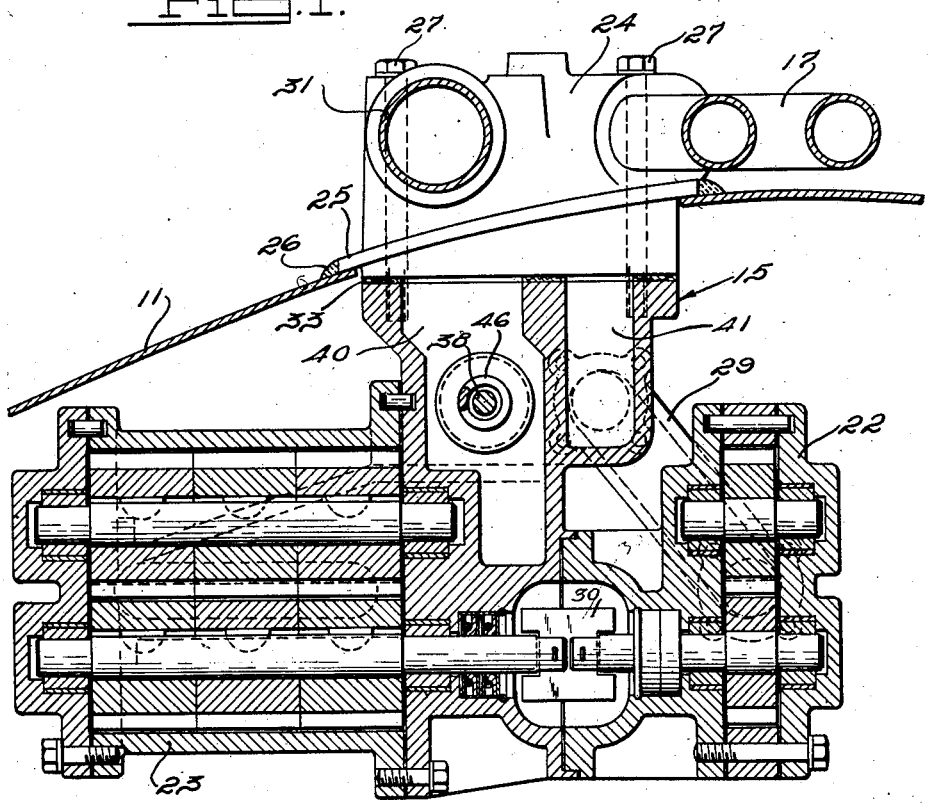

Other objects and features of novelty of my invention will be either specifically pointed out or will become apparent when referring, for a better understanding of my invention, to the following description taken in conjunction with the accompanying drawings, wherein:

Figure 1 is a view, partly in section and partly in elevation, of an automobile tank truck and a pumping system embodying features of my invention, Fig. 2 is an enlarged sectional view of the structure illustrated in Fig. 1, taken on the line 2—2 thereof, Fig. 3 is an enlarged sectional view of the structure illustrated in Fig. 1, taken on the line 3—3 thereof, Fig. 4 is a view of structure, similar to that illustrated in Fig. 1, showing a modified form thereof, and Fig. 5 is a diagrammatical view of the fluid pumping system illustrated in the foregoing figures.

An automobile truck 10 of conventional form is provided with a tank 11 for carrying a liquid. A closure 12 is mounted on the top of the tank for loading, inspecting and cleaning purposes. A sump 13 is provided in the bottom of the tank in which an outlet conduit 14 extends to reach below the normal tank bottom. Within the tank a motor and pump unit 15 is supported. The pump is connected to the intake conduit 14 and to a delivery conduit 16. A motor 22 for driving the pump is connected by a fluid circuit 17 to a driving pump 18 which is driven from a power take-off device 19 connected to the transmission 21 of the truck.

The power take-off device 19 is of the conventional form, being connectible to a gear of the truck transmission and controlled by the usual levers for driving the engine. The clutch of the truck is employed for connecting and disconnecting the truck transmission when the power take-off device is engaged or disengaged from the transmission.

In Fig. 2, the motor and pump unit 15, disposed within the tank 11, is illustrated enlarged. The motor 22 is of smaller capacity than the pump 23 and is directly connected in the pump circuit 17. The tank 11 has a header 24 secured therein, preferably by welding a flange 25 to the tank wall, as at 26. The header forms a support for the motor and pump 15 through the connection effected by bolts 27. The header 24 is provided with independent passageways 41 and 42 of the circuit 17 which are connected by intake and outlet connecters 29 to the motor 22. In this manner, the driving fluid is delivered through the pressure side of the circuit 17 to the header 24 into the driven motor 22 and out through the return portion of the circuit 17.

In a similar manner, intake and outlet ports 31 are provided in the header 24 independent of the ports of the circuit 17, and are connected through passageways 40 and 43 to the intake and outlet openings of the pump 23. A sealing gasket 33 seals the four passageways above described between the header 24 and the motor and pump unit 15. In this manner, a fluid is conducted through the system 17 through the driving motor 22 and returned to the pump 18 which circulates the fluid through the system. The motor 22 drives the pump 23 through a connector 30, which pump 23 draws liquid from the tank through the intake conduit 14 and delivers it through the delivering conduit 16. The tank is emptied under positive pressure from the top rather than as effected heretofore by gravity from the bottom. The rate of flow of the fluid is materially increased in view of the positive pressure provided by the pump.

The system is illustrated diagrammatically in Fig. 5, wherein the power take-off device 19 is directly connected to the truck transmission 21 through the movement of a lever 35 when the clutch of the truck is released and the transmission gears set to neutral driving position. Under these conditions, the engine power is employed for driving the pumping system through the power take-off device 19. The pump 18 is connected in the circulating system 17 and provides a flow of fluid therein for driving the motor 22 at an increased speed. This is effected by selecting a motor 22 having a smaller capacity than the pump 18 so that an increase of pressure and velocity of flow of the fluid will occur at the motor 22 which will operate at a materially greater speed than the pump 18.

A reservoir 36 may be employed in the system to provide an excess amount of fluid therein. The pump 23, which is directly connected to the motor 22, is of much larger capacity than the motor 22 and the pump 18. As a result, a much larger volume of fluid can be pumped by the system through the delivery conduit 16 than could be pumped by the pump 18.

To permit the valve in the delivery conduit 16 to be closed while the system is in operation, a by-pass conduit 37 is shunted about the pump 23, across the intake conduit 14 and the delivery conduit 16. A pressure actuated valve 38 is mounted in the by-pass conduit 37 to be actuated by the pressure which may be built up in the delivery conduit 16. This permits the fluid to flow from the delivery conduit 16 into the intake conduit 14 and thereby form a circuit about the pump 23 to permit the pump to continue to operate without delivering any fluid or building up a pressure. This safety arrangement prevents a pressure from building up in the delivery conduit 16 when the valve thereof is closed and the pump 23 is operating.

With this particular system, the pump 18 may have only a small capacity and may still effect, through the driving of the motor 22 at high speed to drive the large capacity pump 23, a material flow of fluid from the exhaust conduit 16. This system permits the motor 22 and the pump 23 to be remotely disposed from the power take-off 19 and the driving pump 18.

The valve 38 is illustrated enlarged in Fig. 3 disposed in the header 24 containing passageways 41 and 42 therein of the circuit 17. The header 24 is also provided with passageways 40 and 43 communicating with the pump 23 and are cross-connected by the aperture 44 in the wall separating the passageways. A seat 45 is provided at the mouth of the aperture 44 for receiving the valve 38 which is pressed thereon by a spring 46, the tension of which may be regulated by the adjustment of the plug 47. After such adjustment is made, the plug may be retained in position by the lock nut 48. The passageway 40 is connected to the intake side of the pump, while the passageway 43 is connected to the discharge side of the pump, that is to say, to the delivery conduit 16. When the pressure is built up in the delivery conduit 16, due to the shutting off of the valve therein while the system is in operation, the pressure will immediately open the valve 38 to permit the liquid to flow into the passageway 40 and circulate through the pump, as described hereinabove.

In Fig. 4, I have illustrated a further application of the pump, that to a tank 51 having a plurality of compartments 52, 53, 54 and 55 therein. A can-compartment 56 is provided at the rear of the tank in the conventional manner and the motor and pump system 15 is supported therein and operated in the above described manner.

For connecting the pump to the various compartments, an intake manifold 57 is provided, which is interconnected with a plurality of intake conduits 58, one of which is employed for each of the compartments. Each of the intake conduits 58 is provided with a valve 59 which may be of the hydraulic, magnetic, spring controlled or of the manual type as desired, all of which valves are old and well known in the art. For the purpose of illustration, spring pressed valves are disclosed. Each valve has an arm 61 which is urged to closed position by a spring 62. A cable 63 is connected to the arm and is carried over a sheave 64 and connected to a lever 65 which may be pulled downwardly and latched, as on an element 66, for retaining the valve in open position. Each of the valves 59 is controlled from the can-compartment 56 of the tank 51 and, in this manner, the liquid in any compartment may be delivered to the delivery conduit 16 by preselecting the valve to be opened.

It is also within the purview of my invention to open two or more of the valves at the same time to provide for the intermixing of the liquids when being drawn by the pump from the compartments and delivered through the exhaust conduit 16 when such a mixture is desired. The proper amount of each liquid may be obtained by regulating the amount the valves may be opened. For a heavy liquid, the valve may be opened wide, while for a light liquid the valve may be only slightly opened to effect a fifty per cent mixture of the two liquids.

It will be seen from the various arrangements that my particular system is unique and very flexible and, while illustrated and described as applying directly to an automotive tank vehicle, other applications of the system will be apparent to one skilled in the art. The use of the fluid pump and motor eliminates any change of sparks occurring, which would be hazardous, and the motor-pump unit can be placed directly in the tank or adjacent to explosive mixtures.

While I have described and illustrated but two embodiments of my invention, it will be apparent to those skilled in the art that various changes, omissions, additions and substitutions may be made therein without departing from the spirit and scope of my invention, as set forth in the accompanying claims.

I claim as my invention:

1. An automotive vehicle truck having a tank thereon, of a pump and motor unit supported in said tank, means for conducting liquid to and from said motor, means for connecting the pump to the interior and exterior of the tank, a pump exterior of said tank for supplying fluid to said liquid conducting means, and means for driving said exterior pump from the engine of said truck.

2. An automotive vehicle truck having a tank thereon, of a pump and motor unit supported in said tank, means for conducting liquid to and from said motor, conducting means for connecting the pump to the interior and exterior of said tank, a pump exterior of said tank for supplying fluid to the liquid conduction means of said motor, means for driving said pump from the engine of said truck, and a by-pass valve in the conducting means of the first said pump for shunting the liquid about the pump of the unit when the pressure of the liquid pumped thereby exceeds a predetermined amount.

3. The combination with an automobile truck having a tank thereon, of a header on said tank having two liquid conducting circuits therein, a motor and pump operatively connected and supported inside of said tank on said header to have a circuit connected to said motor and said pump, respectively, and means for supplying a fluid to said motor for effecting the operation of said pump.

4. The combination with an automotive tank truck, of a pump, a fluid circuit leading to and from said pump, a conduit by-passing said circuit across said pump, a pressure valve interconnecting said by-pass circuit to the circuit leading from the pump, a valve on the last said circuit which may be closed while the pump is in operation to effect a flow of fluid through the by-pass conduit, a motor for driving said pump, a second pump of greater capacity than said motor for circulating a fluid through said motor and driving said motor at high speed, and a power take-off device connectible to the transmission of the truck for driving said second pump.

5. An automotive vehicle having a tank with a plurality of compartments thereon, a can-compartment in the rear of said tank, a motor and pump supported in said can-compartment, a delivery conduit extending from said pump, a manifold connected to said pump and extending along said tank, intake conduits each having a valve therein connected to said manifold, means in said can-compartment for controlling the position of said valves, and a pump driven by the engine of the vehicle for supplying a fluid to said motor.

6. An automotive vehicle having a tank thereon divided into a plurality of compartments, a manifold on said tank interconnectible through valves to said compartments, a motor and pump unit, the pump of said unit being connected to the manifold, a delivery conduit connected to said pump, and a second pump of greater capacity than said motor driven by the vehicle engine for supplying fluid to said motor, and means for selectively connecting the pump of the unit through the manifold to any of said compartments.

7. An automotive truck having a tank thereon provided with a plurality of compartments, a can-compartment disposed in the rear of said tank, a motor and pump unit disposed in said can-compartment, the pump of which is selectively connectible to said tank compartments from said can-compartment, and a pump driven by the engine of the truck for delivering a fluid to said motor, said second pump being of greater capacity than said motor for driving said motor at a high speed.

8. An automotive truck having a tank thereon provided with a plurality of compartments, a can-compartment disposed in the rear of said tank, a motor and pump unit disposed in said can-compartment, the pump of which is selectively connectible to said tank compartments from said can-compartment, a pump driven by the engine of the truck for delivering a fluid to said motor, said second pump being of greater capacity than said motor for driving said motor at a high speed, a delivery conductor having a valve therein connected to the pump of said motor and pump unit, and a by-pass conduit extending around said pump of the unit and having a valve actuated by the pressure of the fluid in the delivery conduit for by-passing the fluid about the pump of the unit when the valve in the delivery conduit is closed.

EDWARD R. BARRETT.